UNITED STATES PATENT OFFICE.

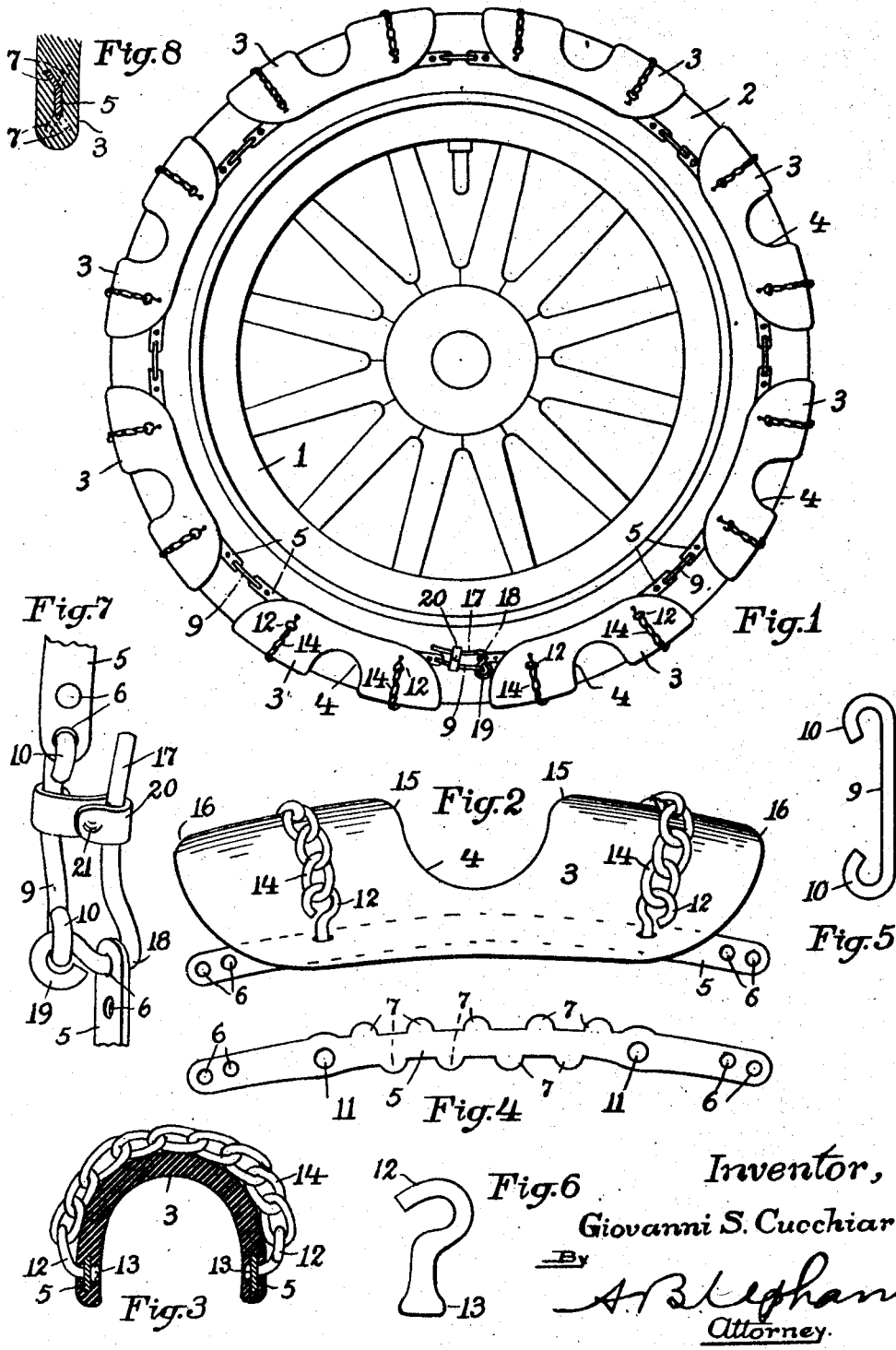

GIOVANNI S. CUCCHIARA, OF NEEDHAM, MASSACHUSETTS.

NON-SKID APPLIANCE.

1,361,022.  Specification of Letters Patent.  Patented Dec. 7, 1920.

Application filed July 7, 1920. Serial No. 394,511.

*To all whom it may concern:*

Be it known that I, GIOVANNI S. CUCCHIARA, a citizen of the United States, and a resident of Needham, in the county of Norfolk and Commonwealth of Massachusetts, have invented certain new and useful Improvements in Non-Skid Appliances, of which the following is a full, clear, and exact specification.

The object of this invention is the effecting of improved means for safeguarding automobiles and trucks from skidding, and also for greatly diminishing the wear of their tires. To this end, I dispose numerous pads, preferably provided with anti-skid chains, about the periphery of the tire, linked together with easily detachable and adjustable means.

In the drawings forming part of this specification, Figure 1 is a side view of a wheel provided with a pneumatic tire and encircled with pads embodying my invention. Fig. 2 is a side view on a larger scale of one of the pads. Fig. 3 is a cross section thereof. Fig. 4 is a side view of one of the metallic coupling bars with which each flap of the pad is provided. Fig. 5 is a detail view of one of the coupling links. Fig. 6 is a side view of one of the anchoring hooks for an anti-skid chain. Fig. 7 is a perspective view of the clamping fastener for the chain of pads. Fig. 8 is a cross section of one of the coupling bars.

In Fig. 1, the reference numeral 1 designates a wheel, and 2 its tire, here illustrated as a pneumatic one, although I do not restrict my invention to such tires. About this tire are arranged a series of pads 3 each composed of rubber or rubber and fabric combined in a well known way. The ends of each pad are rounded as shown in Fig. 2, the center of curvature being preferably near the outer circumference of the tire, and in its midlength is a deep recess 4. Embedded near the edge of each flap of the semi-circular pad is a bar 5 preferably of malleable iron (Figs. 2 and 3) having eyes 6 at each end, and numerous laterally bent ears 7 along its edges, the ears being disposed alternately in opposite directions, as indicated in Fig. 8. This staggering is for the purpose of holding the bars from being drawn lengthwise in the pads.

The links 9 shown in Fig. 5 are adapted for engaging their hooked ends 10 with the eyes 6 as shown in Fig. 1, more than one eye being formed at each end of the bar 5 to enable the chain of pads to fit varying sizes of tires. Through holes 11 spaced from the ends of the bars and corresponding holes in the pads are inserted anchor hooks 12 which terminal enlargements 13 prevent from pulling through, short chains 14 being engaged at their ends with these hooks, as shown in Figs. 2 and 3, each chain passing over the pad with a sufficient looseness to make it grip the roadway in a manner both to give good traction and to prevent skidding. The tractive effect of these chains 14 is reinforced in snow and earth roads by the edges 15 of the recesses 4 and the extreme ends 16 of the pads.

After the pads 3 have been snugly fitted about the wheel tire, they are drawn more tightly about the same by means of a wire lever 17 whose bend 18 engages an eye 6 of a bar 5 and whose eye 19 engages a hooked end of a link 9. Attached to this link 9 is a hooked catch 20 with which the lever arm can be held after the desired tension has been put upon the chain of pads, the inwardly projecting lip 21 serving to insure the lever's retention therein.

The links 9 being disposed to properly space the pads around the tire, with the lever arm 17 out of engagement with an eye 6 in the neighboring bar-end, the lever arm is then inserted through an eye 6 of the neighboring bar 5 until the bend 18 is reached; then the lever is pressed toward the other bar 5 thereby forcing the ends of the bars which are thus connected, closer together and thereby tightening the series of pads upon the wheel tire 2. As soon as this tightening has been done, the lever arm 17 is pressed into the hook 20 of the clip and locked against possible disengagement.

This anti-skid device is not only efficient for preventing skidding, mainly because of its chains 14, but it is equally efficient in its tractive effects, the chains gripping ice and icy ground, and the ends 15, 16 of the pads acting to grip snow, mud and the like. The pads 3 are of further benefit in protecting the tires 2 from wear and cutting by the chains. The device is more easily and quickly applied to a wheel and removed therefrom than are the well known forms of chain anti-skids. Further, the greater friction between the inner surfaces of the pads and the tread of a tire than in the case of the all-chain anti-skids, prevents the wheel from slipping around within the same and thereby losing tractive effect.

What I claim is:

1. The combination with a wheel and its tire, of a series of pads partially inclosing the tread of the tire, each pad being semi-cylindrical in form and composed of yielding material, a metal bar embedded within each side portion of each pad, the ends of said bar projecting from the ends of the pad and having eyes exterior to the pad, and means uniting all said pads including links having hooks engaging said eyes.

2. The combination with a wheel and its tire, of a series of pads partially inclosing the tread of said tire and composed of yielding material, and metal bars embedded within the pads longitudinally thereof, each bar being located near the edge of each pad and having means for attaching the ends of each bar to the ends of adjacent bars, the portion of each bar within its pad being provided with lateral projections to prevent its being drawn through its pad.

3. The combination with a wheel and its tire, of a series of pads partially inclosing the tread of said tire, each pad being composed of rubber and fabric semi-cylindrical in general form, and metal bars embedded within the pads longitudinally thereof, each bar being located near the edge of each pad and terminally projecting therefrom, and having lugs projecting obliquely and alternately from the intermediate portion of the bar to bind it against longitudinal displacement within the pad, and means for connecting the bars of each pad with those adjacent thereto.

4. The combination with a wheel and its tire, of a series of pads partially inclosing the tread of said tire, each pad being composed of yielding material and semi-cylindrical in general form, metal bars embedded in each pad near its edges, means for connecting the bars of each pad with the ones adjacent thereto, each bar having two holes therein within the pad, a hook having a head held in each of said holes, and a chain held at its ends by two opposing hooks.

In testimony that I claim the foregoing invention, I have hereunto set my hand this 3rd day of July, 1920.

GIOVANNI S. CUCCHIARA.